COLOR TELEVISION SYSTEM

Filed Sept. 13, 1947 2 Sheets-Sheet 1

INVENTOR.
William H. Cherry
BY Samuel B. Smith
ATTORNEY

COLOR TELEVISION SYSTEM

Filed Sept. 13, 1947 2 Sheets-Sheet 2

INVENTOR.
William H. Cherry
BY Samuel B. Smith
ATTORNEY

UNITED STATES PATENT OFFICE 2,566,693

COLOR TELEVISION SYSTEM

William H. Cherry, Princeton, N. J., assignor to Radio Corporation of America, a corporation of Delaware Application September 13, 1947, Serial No. 773,874

5 Claims. (Cl. 178—5.2)

This invention relates to improvements in color fidelity in color television, and more particularly to the compensation for inherent limitations of popular image pickup devices.

Within the broad range of light intensities to which the eye is ordinarily subjected, and excepting the two extremes of nearly complete darkness and of viewing highly incandescent bodies, it has been found quite generally that a substantial portion of the properties of most people's eyes which have to do with the perception of color in foveal vision can be tabulated and codified under the comparatively simple system known as trichromatic colorimetry. While the colorimetric properties of different eyes are different, and even the properties of a given individual will change for various reasons and from time to time, it has been found that the different sets of characteristics are, in most cases, sufficiently closely grouped about a mean that the latter, expressed as the characteristics of a standard observer, is satisfactorily representative of the group, and that in the cases where the differences in properties are considerable, the departures are so marked and of such a nature as to be clearly the result of inherent abnormalities which are usually referred to as forms of color-blindness.

Colorimetry is concerned with those of the visual properties directly associated with the wavelength dependence of the intensity of the light being seen, that is, with purely color perception, and strictly speaking, is confined further to the correlation and codification of color matches and color mixtures.

It is a fact well known in the science of colorimetry that the visual sensation of color produced by the light from any source may generally be duplicated or matched, both as to brightness and chromatic properties, by a selected combination of the light from any three sources forming a primary set. However, it is recognized that, for some samples of light, a rather artificial interpretation must be placed on the notion of matching because it may be first necessary to combine light from one or two of the primary sources with that from the sample source before a match can be made. In such an event, the primaries are said to be subtractively added to match the sample.

Substantially all systems of color reproduction, including that of image reproduction in substantially its natural color by electrical devices, are based upon the combination of a plurality of selected component colors, and hardly ever is the direct reproduction of the spectral intensity distribution of the sample attempted. The matching of these combinations of colors with the original colors is, therefore, a primary requisite of good color reproduction.

In most cases, the reproduction of color is strictly a three-color reproduction, that is, the sample color is reproduced by the additive combination of three primary light sources. In this category are definitely included the so-called subtractive processes of printing and photography, for while the primaries may be obtained by subtracting some of the components from white light by means of dyes or pigments, the final result is to present to the eye in various intensities the additive combination of three spectral distributions which amount to three primaries.

Quite generally, a three-color reproduction is limited to samples which require positive amounts of each of the three primaries for their reproductions, obviously because it is impossible to present to the eye negative amounts of light from a primary source. This is a fundamental limitation to three-color reproductions, regardless of whether they are subtractive, as in conventional color photography, or additive, as in conventional sequential and simultaneous color television systems.

Methods of color reproduction utilizing four or more primary colors have been suggested. By using an indefinitely large number of monochrome primaries, it is possible to overcome the limitation on reproducible colors characteristic of a three-color system, but commonly the use of additional primaries is to offset the imperfections in the process, and rarely is anything achieved beyond the capabilities of a three-color system.

In accordance with the well-known laws of colorimetry, the luminous and chromatic properties of a color are completely specified by what are generally known as the tristimulus values of that color. Therefore, the equivalents of the tristimulus values of a color and its reproduction are sufficient to secure the fidelity of that reproduction.

The visual identity of colors may be stated uniquely in terms of the identity of their tristimulus values, and therefore the function of a color reproduction system is to provide colors with the same tristimulus values as occur in the original. While reproducing the original total spectral distributions would indeed satisfy this condition, such a procedure is clearly not necessary, even for exact color reproduction, and it is not possible in a practical sense. Admittedly a three color system which is exactly right for one person may not be quite perfect for someone else, and in addition, poor engineering tolerances may prevent exactly correct reproduction in any case, but in general, for any three parameter system, the precision of color reproduction possible on the basis of colorimetric matching is vastly better than can be achieved by any method of approximately reproducing spectral distributions. Therefore, in all systems of color reproduction, in photography, printing, and color television, and wherever a three color system is used, no attempt is made, nor would it be desirable to approximate the spectral distribution of the original colors. In this way, stimuli of markedly different physical specification from that of the original are selected in order to give rise to the same sense perception.

In terms of the facts and relationships of colorimetry, to achieve accurate color reproduction in a color television system, this selection corresponding to the correct signals must be expressed in the light intensities of the three color sources in the receiver, and this requires, in effect, that the television system operate as an electronic colorimete, individually for each picture element.

In conventional television practice, no attempt is made to duplicate in the receiver precisely the same brightness level as occurs in the scene being televised, but the adjustment of scene brightness is left to the selection of the individual observer.

In color measurements, the securing of quantitative relationships is the primary purpose, and the modification of the visual effect of the sample by the negative addition of the primaries is quite admissible. In reproduction, on the contrary, the sample is not available to be so modified, nor is such desired, for the sample should be reproduced like the original. Therefore, complete accuracy of reproduction will be confined to those colors which require only positive combinations of the three primaries. These colors lie on or within the triangle on the standard chromaticity diagram determined by the three primaries; and at the same time, their luminosities are limited to the luminosity range of the receiver primaries. Therefore, in the design of television receivers, it is of considerable importance to select receiver primaries which will cover the desired gamut of accurately reproducible colors. In the present three kinescope type simultaneous receivers, this is very largely a problem in phosphor composition. Fortunately, phosphors are available with very satisfactory spectral charateristics, although there is ever a need for more luminosity. Some of these phosphors, in combination with optical filters, are capable of saturation so nearly approaching that of monochromatic light, at well-separated points of the chromaticity diagram, that simultaneous receivers can accurately reproduce the colors from virtually all natural and artificial dyes and pigments and more. They are not able to reach pure monochromatic colors such as spectroscope will produce, but they can easily reproduce rainbow colors which are, as usual, diluted with a small amount of white light. The available color gamut is greater than in most other color reproduction systems and appears adequate.

The same basic fact of colorimetry, that the matching of a color outside the chromaticity triangle of the three primaries requires negative amounts of one or more of these primaries, plays a dominant role in the image pickup portion of a color reproduction system. While the function of the color camera is to examine the incoming light quality of a color and determine the three correct signals with which to control the respective receiver primaries, the procedure for doing this is in principle common to virtually all photo pickup devices or camera tubes involving the analysis of this light into its monochromatic components. For each contributing spectral component, each separate pickup device forms or, in principle, should form, the signals for the receiver required to reproduce that contribution by itself, and then the cumulative sum of these small component signals is obtained in an integration process and sent out as the final signals required to match in tristimulus value the total spectral distribution of the original color. In the usual photoelectric devices, this procedure is intended to be carried out all at once, for the incoming light is examined spectrally by virtue of the spectral sensitivity of the photoelectric surfaces and the spectral transmission characteristics of optical filters which may be used in conjunction with them. For each small wavelength interval, contributing photoelectic currents are obtained proportional, more or less, to the product of the intensity at that wavelength of the incoming light and the effective sensitivity of the camera tube. The summation or integration process is obtained directly because the output current is the total of the current contributions of all the wavelength intervals. Now, as has already been pointed out, in order to match monochromaticolors, negative amounts of at least one of the conventional receiver primaries are required. Thus, the output signals based on the totality of proper monochromatic signals must, for various wavelengths, have taken into account certain negative amounts. If, as usual, the receiver primaries are capable of reproducing the desired color, these total signals will be positive, but in every case it is certain from the laws of colorimetry that negative contributions to these signals from various wavelengths in the spectrum of the original color will have been taken into account. This requires, in contrast to the capabilities of existing pickup devices, that for some wavelengths the signal current put out must be in reversed polarity to that for other wavelengths if each color pickup or camera tube is individually to perform the entire process of scanning a signal for a receiver primary.

As yet, no camera tubes have been developed which yield, in effect, negative photo-response in some wavelength intervals. Hence, it has not been possible to realize the negative portions of the light values which are essential to accurate color reproduction when the three receiver signals ar derived separately.

The frequently suggested remedy, that a constant or bias be added to the light values so as to make them positive, the camera sensitivities be adjusted to the result, and then subsequently a constant signal be subtracted, is, of course, useless, because the "constant" signal is a function of the incoming light characteristic.

According to this present invention, the television system is adjusted partly by means of interposed light filters to have spectral sensitivities which, expressed mathematically, are positive, independent, and linear combinations of the tristimulus functions of $\bar{x}$, $\bar{y}$ and $\bar{z}$ well known in colorimetry. The three independent signals derived as a result of converting the component images into electrical representations are formed into three linear combinations (sums and differences) by three properly adjusted electrical networks. The three resultant signals are then transmitted, each to its appropriate receiver primary color, and assuming the overall system to be linear, the receiver will reproduct absolutely and correctly the colors viewed by the transmitter.

This achievement is fundamentally not possible in conventional systems where the camera spectral sensitivities are not complete linear combinations of the $\bar{x}$, $\bar{y}$ and $\bar{z}$, and the signals are not formed into linear combinations.

According to this invention in another of its forms, primarily applicable to sequential systems, two camera tubes are registered simultaneously and, as in conventional sequential systems, three filters are successively placed before the camera tube, and in conjunction with each of three filters appearing before one camera tube, an associated filter appears before the other camera tube. The transmissions of the filters are so adjusted that the curve of sensitivity of one camera tube as a function of wave length has the shape of the positive part of the desired transmitter characteristic, while the other tube's sensitivity curve has the shape of the negative part of the transmitter characteristic. The signal from the second tube is then subtracted electronically from that of the first, and the resulting difference constitutes the correct signal to be transmitted to the receiver. The camera instrument as a whole, therefore, displays the part positive, the part negative, spectrum sensitivity characteristics fundamentally necessary for correct color reproduction.

A primary object of this invention is to provide an improved color television system.

Another object of this invention is to improve spectral response of television systems.

A further object is to improve fidelity of color reproduction.

Still another object of this invention is to compensate for spectral limitations of popular image pickup devices.

Other and incidental objects of the invention will be apparent to those skilled in the art from a reading of the following specification and an inspection of the accompanying drawing in which:

Figure 1 illustrates by block diagram one form of this invention as applied to the simultaneous type color television;

Figure 2 illustrates, for purpose of explanation of the operation of this invention in its various forms, the chromaticity diagram based on I. C. I. standard observer and coordinate system;

Figures 1, 2, 3:
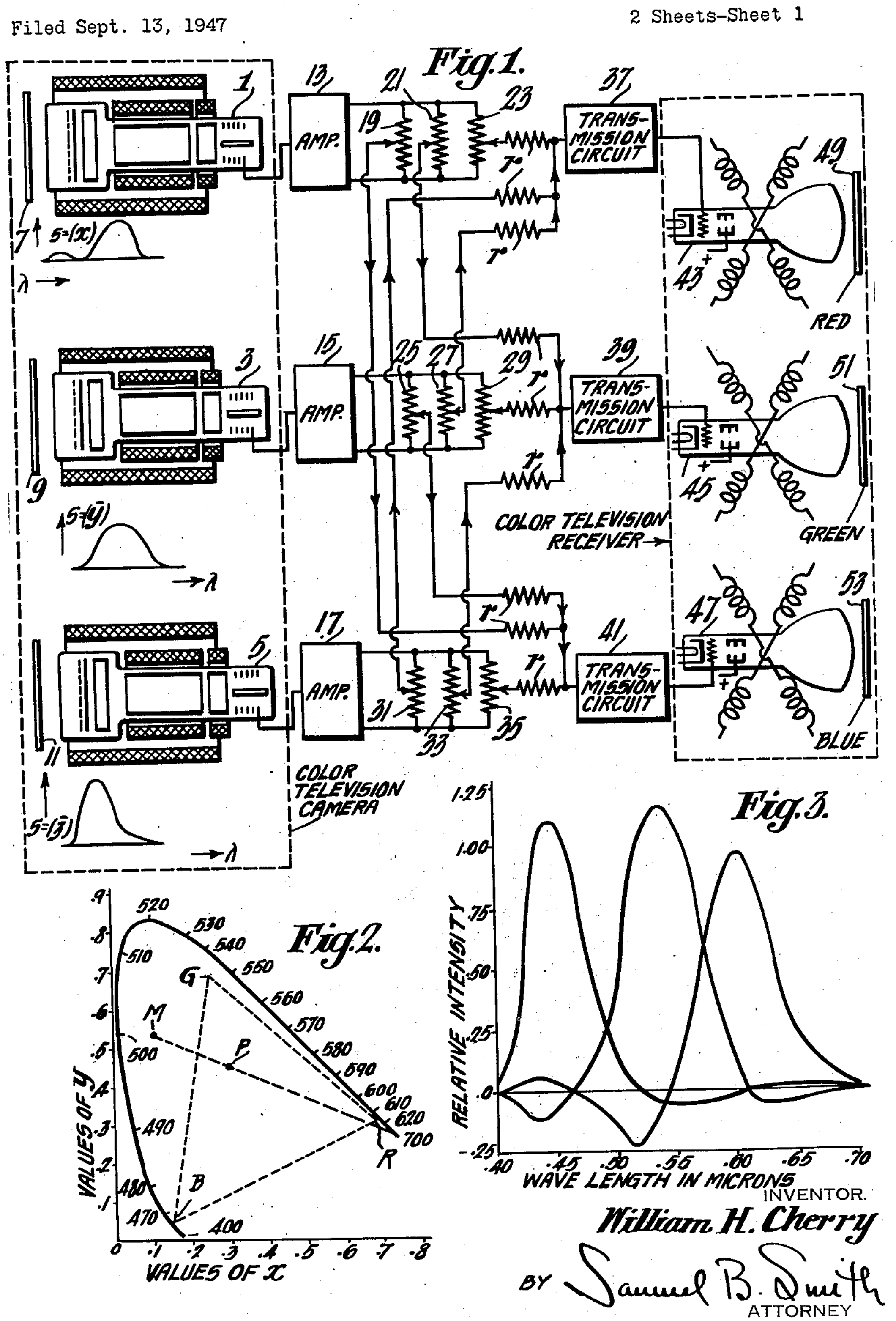
Figure 3 illustrates graphically spectral coefficient curves in terms of Wratten filters #25, #47 and #58 in combination with the standard "C" illuminant as matching stimuli.

The necessity of including negative light values in color reproduction can perhaps be better understood after a brief reference to the purpose and operation of a colorimeter, which is a principal instrument in the art of colorimetry.

The colorimeter consists essentially in simple optical means for presenting to the eye two immediately adjacent, uniformly luminous fields, usually two adjacent semi-circular discs, or possibly two concentric discs, one an annular ring surrounding the other, and means for quantitatively altering the light intensities and combinations in each of the two fields separately. The sample field and the standard or matching field of the colorimeter may be white matte surfaces, capable of being illuminated simultaneously by several light sources whose intensities are continuously variable while their respective relative spectral distributions remain unchanged. Whatever the method employed for illumination, care must be taken to preserve the spectral character of the resultant light appearing in the colorimeter.

Measurements with the colorimeter are performed by adjusting the intensities and mixtures on the standard side until the line of demarkation between the sample field and the standard field disappears. There is thus no visual distinction between one side and the other (except location, of course) and the two colors are said to match.

Whenever the color gamut of the samples to be examined will allow, it is more convenient and more precise if the matching sources are capable of effecting direct matches. In general, directly additive matches, in which the matching sources illuminate the matching field alone, and the sample source illuminates the sample field alone, are not always possible. In order to effect a match, it is sometimes necessary to divert one or more of the matching sources from the matching field to the sample field and, so to speak, dilute the light from the sample source with the lights from some of the matching sources. In these cases the matching light intensities added to the sample are said to be added to the matching field with negative intensities. It is therefore possible to match any sample with light from any set of three primary sources or with light from the white and monochromatic sources.

Two color sources are said to be primary with respect to each other if, when they are regarded in the two fields of the colorimeter, no non-zero adjustment of their intensities can produce a match; three color sources are said to be primary with respect to each other, and form a set of primaries, if no one can be matched by any combination of the other two.

The colorimetric data yields three functions or combinations thereof, which are conventionally tabulated as the colorimetric distribution functions and often symbolized by $\bar{x}$, $\bar{y}$ and $\bar{z}$, numerical quantities dependent on wavelength. These functions are to be interpreted as the intensities of the three ideal primary sources needed to match unit intensity monochromatic light of the corresponding wavelength. It is important to realize that although functions of wavelength, and at the same time representing intensities, these quantities by no means represent the spectral intensity distribution of the primary source. Their connections with the latter are quite indirect. Furthermore, when the data are converted to a given set of primaries in actual use, the resulting functions likewise do not describe the spectral distributions of the primaries. They state what intensities of the primaries, with all their spectral distributions, are required to match various monochromatic colors. These colorimetric functions state, therefore, what total intensities of the primaries are required in a given case, not what spectral distributions in the primaries are required. Thus it turns out that while a chosen set of primaries may have zero intensities over considerable portions of their spectra, the appropriate distribution functions of wavelength are never zero (within the visible spectrum), except perhaps at a few singular wavelengths.

It will be seen from the preceding discussion that in order to reproduce colors accurately, an arrangement for providing negative relative luminosities of certain spectra is required.

Figure 1 illustrates one system and method for obtaining negative relative luminosities for inclusion in a television signal. Image pickup tubes 1, 3 and 5 may take any of the well known forms such as, for example, the image orthicon shown and described in an article entitled "The Image Orthicon, A Sensitive Television Pickup Tube" by Albert Rose, P. K. Weimer, and H. B. Law, published in the "Proceedings of the Institute of Radio Engineers" for July 1946.

Each of the image pickup tubes 1, 3 and 5 are provided with light filters 7, 9 and 11, respectively, chosen so that the effective spectral sensitivity of each tube, resulting from the combined properties of the light filter, other optical media which may be present, and the actual sensitivity of the photo surface alone, is substantially proportional quantitatively to a positive, linear combination of the standard distribution coefficients or tristimulus values of the spectral colors, functions well known in the art of colorimetry and frequently symbolized by $\bar{x}$, $\bar{y}$ and $\bar{z}$. It is necessary, however, that the three linear combinations chosen for the pickup tubes be mathematically independent. A very simple example of this may be that tube 1 has a filter 7 associated therewith such that its effective sensitivity is proportional to $\bar{x}$ alone, the tube 3 has a filter 9 associated therewith such that its effective sensitivity is proportional to $\bar{y}$ alone, and tube 5 has a filter 11 associated therewith such that its effective sensitivity is proportional to $\bar{z}$ alone. Of course, more complicated linear combinations may be used to harmonize more readily with available filter characteristics.

Now, it is occasionally desirable to televise a scene in color not exactly as it appears, but rather as it would appear were it illuminated by a light source not actually being used. For example, it may be desired to show a scene as illuminated by daylight, even though incandescent lighting is actually being used. Then, to the above or any proposed linear combinations of the distribution coefficients, a corrective factor may be applied, the same for all three pickup tubes, which is proportional to the quotient of the spectral intensity distribution of the desired light source divided by the spectral intensity distribution of the light source actually used. The optical filters associated with the respective camera tubes should thus be chosen so that the overall effective spectral sensitivities of these pickups are proportional to the above corrected functions. A considerable saving in light, or conversely, in sensitivity, may be obtained in this manner as compared with the usual procedure of applying the illuminant transforming or correcting filter directly as an individual unit to the light from the illuminant or from the scene.

The scanning in the three large image pickup tubes 1, 3 and 5 is provided in synchronism and registry in order that three independent signal trains, each representative of a different selected component color, will be furnished to amplifiers 13, 15 and 17.

The output circuit amplifier 13 is connected to a voltage dividing network consisting of three potentiometers 19, 21 and 23.

Likewise, the output circuit of amplifier 15 contains a network of three voltage dividing potentiometers 25, 27 and 29.

Amplifier 17 contains potentiometers 31, 33 and 35 in its output circuit.

Transmission circuit 37, which may, for the purpose of illustration, be a radio circuit, derives its principal signal energy from amplifier 13 through voltage divider 23. Transmission circuit 37 also derives a predetermined amount of energy from amplifier 15 through potentiometer 27. Transmission circuit 37 also obtains a predetermined amount of energy from amplifier 17 through voltage divider 31.

Transmission circuit 39 obtains its principal signal energy from amplifier 15 through potentiometer 29. Transmission circuit 39, however, also obtains signal energy from amplifier 13 through potentiometer 21 and energy from amplifier 17 through potentiometer 33.

Likewise, transmission circuit 41, although obtaining its principal signal energy through amplifier 17, does obtain some signal energy from amplifiers 13 and 15 through voltage dividers 19 and 25 respectively. Transmission circuits 37, 39 and 41 are connected respectively to image reproducing tubes 43, 45 and 47 which, in combination with and through their associated color filters 49, 51 and 53, reproduce the three selected component color images in optical registry.

The basic system to which this invention is applicable in its form illustrated in Figure 1 is well known in the art as the simultaneous type system, involving the simultaneous transmission of several selected component color signals.

In an explanation of the operation of the form of the invention shown in Figure 1, it will be best to refer briefly to Figure 2, wherein there is illustrated by a solid line a chromaticity diagram adopted as standard by the International Committee on Illumination.

In order to illustrate graphically the law that every monochromatic color in the spectrum may be matched by a suitable mixture including negative values of three properly chosen independent primary colors, it is necessary for practical purposes that the law be represented by plotting the trichromatic coefficients $x$ and $y$ on a two-dimensional diagram. In Figure 2, the solid line represents the locus of all the spectrum colors. This solid line is determined by computing the trichromatic coefficients of each of the spectrum colors from a group of tristimulus values adopted as standard by the International Committee on Illumination for the various spectrum colors.

The tristimulus values of the spectrum colors need not be set out here, but may be found in any of the well known textbooks on color, such as, for example, the "Handbook of Colorimetry" prepared by the staff of the Color Measurement Laboratory, Massachusetts Institute of Technology, and published by the Technology Press, Massachusetts Institute of Technology, Cambridge, Massachusetts.

It will be noticed that the I. C. I. curve illustrated by the solid line of Figure 2 is everywhere either straight or convex, but never concave. From this, it follows that the color resulting from a mixture of any two wavelengths must lie either on the locus or within the area bounded by the locus, but never outside it. This applies even more strongly when several radiations are combined, hence it appears that the area included by the spectrum locus and the straight line joining its red and violet extremities defines the region on the chromaticity chart outside which no homogeneous or heterogeneous stimulus will be located. The position of any test stimulus, that is, some light source or colored surface, can be determined either by matching it on a colorimeter and evaluating its unit equation or by measuring the spectral composition of the light and making the appropriate calculation of the unit equation from the distribution curves.

If three primary colors are selected for the receiver, such as, for example, Wratten filters 25, 47 and 58 in combination with the standard "C" illuminant, there may be plotted on the chromaticity diagram a triangle whose dimensions and shape are governed by the $x$, $y$ and $z$ coordinates of the selected colors.

The $x$, $y$ and $z$ coordinates of the Wratten filters selected are plotted to form the dotted triangle in Figure 2. For convenience in explanation, the point of the Wratten filter 25 has been designated as R, the point of the Wratten filter 58 as G, and the point of the Wratten filter 47 as B.

The fact that the locus from the extreme red end of the spectrum to the green is very nearly straight means that spectral orange, yellow and yellow-green radiations can be very closely matched by a mixture of monochromatic red and green stimuli. On the other hand, in the blue-green region, the locus is deeply curved and lies well beyond the line BG. This indicates that mixtures of blue and green are more desaturated than the spectral blue-green radiations. No additive combination of red, green and blue reproduces an adequate match of a spectral blue-green radiation, nor, in fact, of any other spectral radiation, since the spectrum locus lies wholly outside the triangle RGB, and to measure a stimulus M of Figure 2, a suitable amount of red must first be mixed with it. When sufficient of red has been added, the mixture will have moved along the line MR until a point, such as P, will be reached lying inside triangle RGB. P can then be matched by a positive mixture of red, green and blue, and subsequently the amount of red which has been added can be measured. By subtraction, the negative amount of red in M can be derived, and hence the unit equation for M alone can be calculated.

It is also important in the consideration of the operation of this invention that light represented on the chromaticity diagram at point P in Figure 2 may contain a spectral distribution including colors in the vicinity of M, and furthermore, may contain a spectral distribution along the curved line between, for example, .38 $\mu$ and .52 $\mu$.

It will be seen, therefore, that an accurate reproduction of the light positioned at point P cannot be made with three positive values of red, blue and green, even though it is positioned within the triangle RBG.

A brief reference to the curves illustrated in Figure 3 will also show the requirement for negative light values in proper color matching.

The curves of Figure 3 are called spectral distribution curves for the equal-energy spectrum employing the Wratten filters 25, 47 and 58 as matching stimuli. The curves show the relative luminosities of the three matching stimuli required to match all spectral radiation between .40 and .70 microns. The excursion below the zero ordinate indicates negative value light energy.

In the choice of primary colors, simultaneous television systems involving the registration of three kinescope screens are in a more favorable position than any other color reproduction scheme. This is in contrast to sequential systems because, for example, the chromaticities of the primaries are not limited by any considerations of reducing flicker as by equalizing the luminosities.

Again in contrast to sequential systems, it is possible to select three different phosphors for the three primary colors so that the associated filters, if necessary at all, reduce the light intensity by such a comparatively small amount that much more nearly monochromatic primaries can be obtained with good brightness. The result of these advantages is that, in simultaneous systems, three primaries can be chosen which can reproduce, with virtually no practical exception, the colors of all commercial and natural dyes and pigments.

In the reproduction of a given sample color, that is to say, its exact reproduction and not its incorrect rendition, it is the function of the photographic negative, the transmitter, or whatever is the equivalent element in the process, to measure or determine in some way the correct intensity at which the reproducing primaries must be presented.

Principles well known in colorimetry specify very clearly what some of the characteristics of the camera instrument must be to perform this function properly. The camera must form three integrals with respect to wavelength of the light given by the sample and multiplied by three functions of wavelength obtained from the color vision properties of the normal human eye. The appropriate primary intensities are then obtained directly from these integrals. Now, the usual photochemical and photoelectric mechanisms are of this general nature: Integrative with respect to wavelength, although the sensitivity curves are seldom of the colorimetrically desired shape.

By the interposition of light filters as shown in Figure 1, as R, B and G which are selected to have suitable transmission characteristics, it is possible to readjust the resultant sensitivity curves of the camera tubes 1, 3 and 5 to the proper shape, but there is a very important exception to this. Under certain conditions, as outlined above, the desired sensitivity curves must be negative, that is, correspond to detractive responses, for some wavelengths. To achieve this by the simple means of interposed filters is obviously impossible, for filters cannot have less than zero transmission, and the photosensitive mechanisms themselves are almost always of positive sensitivity only. This positive sensitivity seems at present to be universally characteristic of photoelectric receptors suitable for television cameras.

In one form of the present invention, three simultaneously viewing camera tubes are required as conventionally, but the sensitivity curves, while in conformance to the restriction of being always positive, must be chosen differently from the conventional ones. In addition to the usual amplification, the outputs from these three tubes must be formed in three linear combinations and the results are then ready to be broadcast to the receiver. These linear combinations may be formed in a variety of well known ways, the simplest of which is a network of resistors, as shown.

Assuming the three primary colors of the color television receiver to be given (presumably chosen to give the most desirable gamut of reproducible colors), the tristimulus values X, Y and Z of these three primaries *r*, *g* and *b* may be calculated according to the rules of colorimetry. The laws for color reproduction then state unequivocably that the three signals controlling (assuming linearity) the intensities of the receiver colors must be the equivalent of three signals obtained at the transmitter by integrative photo-receptors (such as a photocell or conventional camera tube) with the following spectral sensitivities:

For the *r* primary:

$$\bar{x}(Y_gZ_b-Y_bZ_g)+\bar{y}(X_bZ_g-X_gZ_b)+\bar{z}(X_gZ_b-X_bZ_g)$$

For the *g* primary:

$$\bar{x}(Y_bZ_r-Y_rZ_b)+\bar{y}(X_rZ_b-X_bZ_r)+\bar{z}(X_bY_r-X_rY_b)$$

For the *b* primary:

$$\bar{x}(Y_rZ_g-Y_gZ_r)+\bar{y}(X_gZ_r-X_rZ_g)+\bar{z}(X_rY_g-X_gY_r)$$

Here X, Y and Z denote the tristimulus values of the colors indicated by the subscripts *r*, *g* and *b*. These colors may be red, green and blue, but they need not be. $\bar{x}$, $\bar{y}$ and $\bar{z}$ are three functions of wavelength known in the science of colorimetry as the distribution functions of equal energy monochromatic light for the standard observer. Functions $\bar{x}$, $\bar{y}$ and $\bar{z}$ are well known. They are always positive. However, it can be proved that for all real colors that may be in the receiver, the coefficients $(Y_gZ_b-Y_bZ_g)$, etc., must be in some cases negative such that at some wavelengths the spectral sensitivities given above must be negative. If, then, the signal for each receiver primary is to be obtained from a single camera tube, as in conventional systems, that tube must have negative sensitivity at some wavelengths. This cannot be obtained, so in conventional systems, which, of course, do derive each receiver primary signal from a single camera tube, correct color reproduction is impossible.

It is proposed to derive the signal for each receiver primary from a particular linear combination of the signals from each of the three camera tubes. The spectral sensitivities of each of the three camera tubes, with associated filters, are in general required to be merely three independent, linear, positive combinations of the functions $\bar{x}$, $\bar{y}$ and $\bar{z}$. The simplest example of this, and indeed one which may be preferable, is for one camera tube to have a spectral sensitivity equal to $\bar{x}$, the second camera tube to have a sensitivity curve equal to $\bar{y}$, and the third $\bar{z}$. These are all positive and fairly smooth, uncomplicated curves. They are among the easiest to achieve. It is important, however, that the actual spectral sensitivities of the camera tubes with their filters should correspond to these curves quite closely. Then, by means of simple linear networks, the three desired linear combinations of the signals from the camera tubes may be formed and then transmitted to their respective primary kinescopes in the receiver.

In the design of the light filters to provide the camera tubes with the effective sensitivities which have been selected, additional characteristics are frequently incorporated to compensate for the light source illuminating the subject being televised. It very often happens that the light source is limited in its spectral characteristics by other considerations, as, for example, in the flying spot slide and movie scanner where the phosphor must be of high intensity and very short decay time, while slides and movies are ordinarily intended for projection with light from a tungsten lamp. Rather than applying an optical filter directly to the light from the phosphor, a very substantial saving in intensity can be obtained by modifying the effective sensitivities of the camera tubes so as to give the equivalent overall characteristics as if the proper illuminant were used.

The network used for the algebraic addition of the camera signals usually requires some means of phase inversion to secure at the same time signals of both polarities. The combination of the signals is then easily accomplished by purely resistive elements which may have already fixed in them the appropriate constants as computed from colorimetric relations, camera sensitivity and receiver intensity distributions. For reasons of avoiding these calculations and of avoiding the need for reliance on precision in the circuit components, it is perhaps preferable to provide adjustable circuit elements which can be set when the system is in operation. In spite of the large number of variables, usually nine or more, a rapidly converging procedure of adjustment can be secured through the obvious facts that the transmission of white must yield white and that the camera, when viewing a light source of the same tristimulus values as any one of the three primaries in the receiver (this source may conveniently be a dummy receiver) and the combining networks, must yield a signal in the corresponding channel controlling that primary, and in no other channel. The adjustment of the white requires a balancing of the three signals output to the receiver, and for this purpose it is more convenient to provide separate gain controls in the output channels even though there is then a duplication of variables.

In the design of the combining networks, the engineer is faced with the alternatives of computing and measuring the proper combination coefficients beforehand and, with this information, designing the equipment so as to have a minimum of parts and material, or designing the equipment at the start so as to be adjustable over all possible combination coefficients that may be desired. The latter method is to be preferred because the effective amplifications and other circuit parameters are in practice not capable of previous calculation to any great degree of precision, and even if this difficulty should be overcome, the resulting fixed circuit would be usable only with a receiver of one definite set of three colors.

The resistance network of the transmitter is made adjustable, so that not only may the correct values be set by a quickly convergent series of adjustments, but should the receivers be altered, as by changing the phosphors in the kinescopes or changing the light filters, the transmitter can be quickly readjusted for use with the new receivers.

Examining the circuit shown in Figure 1 from a more practical standpoint, it may be desirable to include buffer amplifiers ahead of resistances "*r*" to prevent possible undesired reaction between the several circuits.

A possible procedure for empirical adjustment of the simultaneous system illustrated in Figure 1 is outlined below in connection with Figures 4 and 5: The adjustable potentiometers of the circuit may be labeled by the camera tube from which its signal is derived as $x$, $y$, $z$, and the receiver tube to which its signal goes as $r$, $g$, $b$, thus $xr$, $xg$, $yb$, etc. The $r$, $g$ and $b$ sets of three are adjusted independently so that the procedures for the $g$ and $b$ sets are, in general, the same as for the $r$ set. In the adjustment procedure for the $r$ channel, advantage is taken of the obvious requirement that if the transmitting camera views colors the same as those of either $g$ or $b$ in the receiver, no signal should appear in the $r$ channel, while if the camera views a color the same as that of $r$, a positive signal should appear on the $r$ channel and with maximum gain for economy's sake. A convenient and reliable source for such colors is a dummy receiver, that is, a receiver which is not receiving a transmitted signal.

If $X_r$, $Y_r$, $Z_r$, $X_g$, etc., denote the signals engendered in the respective camera tubes by the colors $r$, $g$ and $b$, while $xr$, $xg$, etc. denote not only the potentiometers but the algebraic values of their settings as fractional parts of unity, the above requirement may be represented mathematically by the set of equations:

$$X_r xr + Y_r yr + Z_r zr = \text{maximum positive signal}$$
$$X_g xr + Y_g yr + Z_g zr = 0$$
$$X_b xr + Y_b yr + Z_b zr = 0$$

Treating $xr$, $yr$ and $zr$ as Cartesian coordinates, the desired adjustment is therefore represented by the intersection of the three planes given by these three equations. The latter two pass through the origin $xr=0$, $yr=0$, $zr=0$, and therefore their line of intersection does also. The signal indicated by the first equation is proportional to the distance from the origin along this line to where the first plane intersects it. Now the first plane cannot be moved parallel to its former position indefinitely far from the origin because the magnitudes $xr$, $zr$ and $yr$ cannot be greater than unity. Therefore, the desired adjustment is achieved at the point where the above line of intersection passes through the cube whose center is the origin and one of whose corners is at $xr=1$, $yr=1$, $zr=1$. By setting any two of the potentiometers at plus or minus one value, varying the third over its gamut, and while viewing alternately the $g$ and $b$ colors monitoring the signal of the $r$ channel, it is easy to explore the edges of the cube. When the adjustment passes through the $g$ plane, while the $g$ color is being viewed, the $r$ signal passes through zero, and similarly for the $b$ plane. Either by repeated trial of the subsequent part of the procedure or by recording and plotting on a cube drawing the settings at which these planes intersect the cube edges, that is, these zero adjustments, it is quite easy to determine on which cube faces the desired intersection occurs. While the correct position may be computed from these data, once the correct face of the tube is determined and the one potentiometer set at the appropriate extreme position, it is better to find the final adjustment by the following quickly convergent procedure:

On the cube face, the points $g_1$, $g_2$ and $b_1$, $b_2$ are known, at least approximately. Set on one such point, say $g_1$, where by altering only one of the potentiometers it is obviously possible to reach the $b$ line. Make this adjustment (while viewing $b$ with the transmitter) and then move back about half the distance. Leaving this potentiometer set and viewing $g$, return to the $g$ line by means of the other potentiometer. Leaving the latter set as now, with the first altered potentiometer return to $b$. Back off halfway and return to $g$, and so on. The final adjustment will be indicated by the fact that there is no signal in the $r$ channel when viewing either $b$ or $g$. There remains the possibility that the signal when viewing $r$ is maximum negative. Should this be so, the procedure should be repeated on the diametrically opposite cube face.

In this simultaneous system, the adjustment for white is substantially the same as in conventional systems. With the camera viewing white, the gains in the three channels subsequent to the formation of the three linear combinations are adjusted for equal modulation of the carrier and then with such a signal broadcast, each receiver is adjusted with respect to its gains in the three channels so as to reproduce white.

Should four or more primary colors be used in a television system, this method may still be used to achieve correct color reproduction, and in its basic outlines it is still essential for that purpose.

Figures 4, 5, 6:
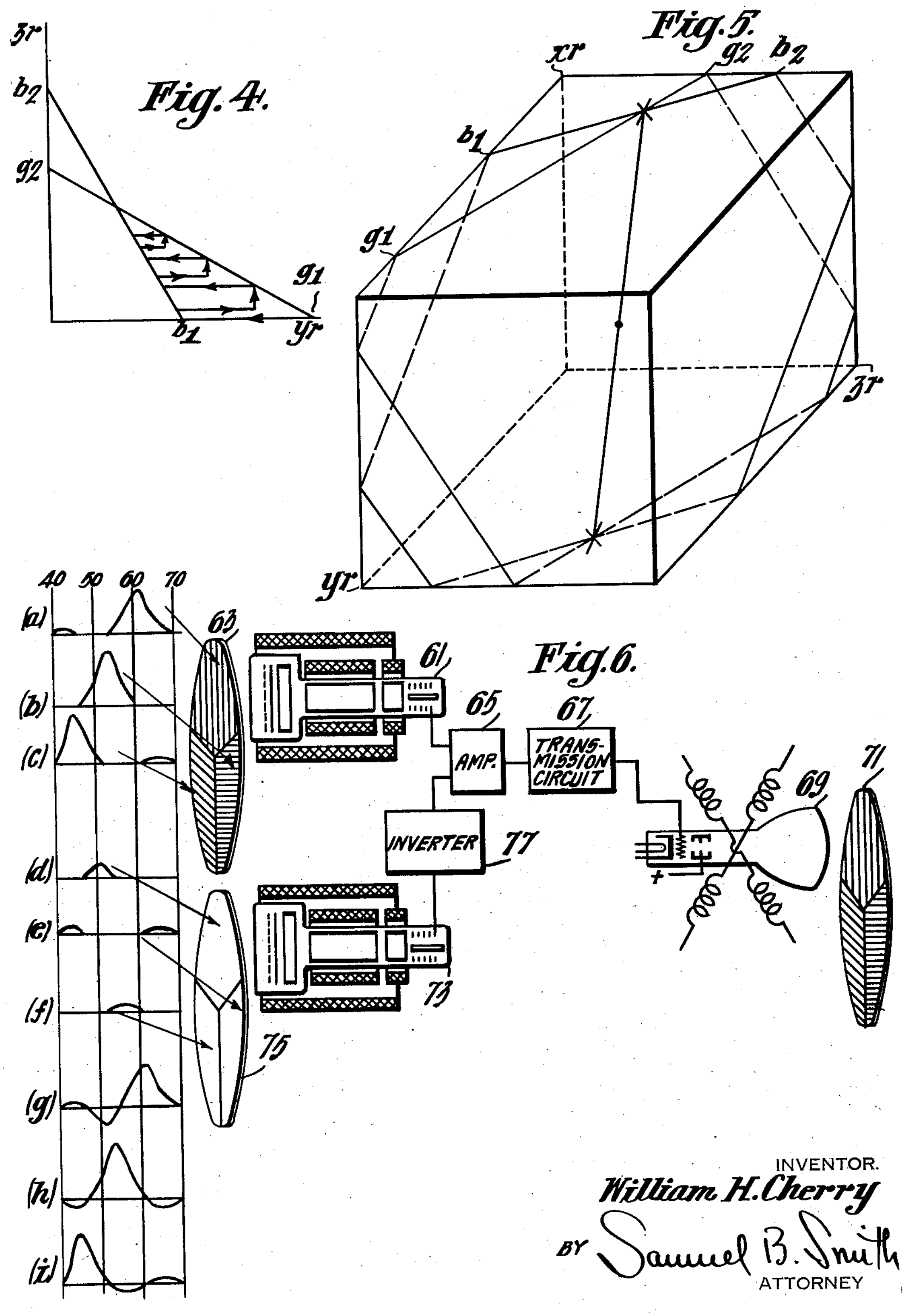
Figures 4 and 5 illustrate graphically one method of adjustment for proper operation of this invention.
Figure 6 illustrates by block diagram one form of this invention applicable for the transmission of color images by the sequential method.

Turning now to Figure 6, there is shown still another form of this invention applied to the familiar sequential type color television system.

It will be understood that if there is provided an auxiliary camera tube for each of the ones in the conventional arrangement, such that the effective sensitivity of one corresponds to the positive part of the light values and the sensitivity of the associated auxiliary camera tube to the negative part, the differences of the outputs would give precisely the desired signals.

A procedure achieving the desired results as applied to sequential color television systems may be had by turning the transmitters into partly simultaneous arrangements.

Camera tube 61, which is illustrated as the popular image orthicon type, contains an associated rotating color disk 63 whose elements contain characteristics illustrated in associated curves "a," "b" and "c."

The signal obtained from the image pickup tube 61 is transmitted through amplifier 65 to a transmission circuit 67 which may, for example, comprise a radio system. The image reproducing tube 69 has an associated rotating color filter 71. It is well known in the television art that if the color disks 63 and 71 rotate in synchronism, a color image may be reproduced. The upper portion of the block diagram of Figure 6 just described may take any of the well known conventional sequential type color systems, such as, for example, that shown and described in an article entitled "An Experimental Color Television System" by R. D. Kell, G. L. Fredendall, A. C. Schroeder, and R. C. Webb, beginning on page 141 of the "RCA Review" for June 1946.

The image pickup tube 61, although shown as the image orthicon, may take any of the well known forms. The image orthicon is described in detail in an article entitled "The Image Orthicon—A Sensitive Television Pickup Tube," by Albert Rose, P. K. Weimer, and H. B. Law, published in the "Proceedings of the Institute of Radio Engineers" for July 1946.

In the practice of this form of the invention, an auxiliary image pickup tube 73 is provided with an associated rotating color disk 75, rotating in synchronism with the color disk 63, but having color filter sections with characteristics of the type illustrated in curves "d," "e" and "f."

Signals from the image pickup tube 73 are transmitted through an inverter 77 to be combined with the signals from image pickup tube 61 in amplifier 65.

If the two camera tubes 61 and 73 simultaneously scan the scene for each of the three frames of color signals to be transmitted, and image pickup tube 61 with its associated color filter disk 63 has filters corresponding to the positive section of the light curves required for the reproduction of colors, and tube 73 employs a color disk 75 having positive characteristics corresponding to the shape of the negative part of the required spectra for the complete reproduction of color images, the signals from the tube 73 can be subtracted from the signals from tube 61.

The difference in the signals will correspond to an ideal transmitter having the desired positive and negative sensitivity curves.

If both tubes 61 and 73, together with their associated filters 63 and 75, in addition to the specified sensitivities, have the same incremental sensitivity through any portion of the spectrum, these increments obviously would subtract out and not alter the final result.

It is obvious that the same method described above for sequential television systems can be taken over directly into the conventional type of simultaneous systems, which employs three camera tubes simultaneously viewing the scene to be televised. Such a procedure would require a total of six such tubes, and while not impossible to arrange, is fortunately far in excess of the minimum requirements. Actually, it is one of the very great advantages of simultaneous color television systems over sequential ones that, in order to give colorimetrically correct reproduction, it is not necessarily appreciably to complicate or increase the camera equipment at all.

As a result of the rigorous application of colorimetric information for simultaneous color television which is admirably well suited to the purpose, a new medium for the reproduction of color has become available. It is capable of by far the finest performance yet known in commercial processes, having at the same time a wide gamut of colors, colors of very high saturation, and an intrinsically accurate means of adjusting these colors automatically.

Having thus described the invention, what is claimed is:

1. A color television system comprising in combination a television image pickup device to convert substantially instantaneously a color image into a plurality of electrical signals, including a selected group of spectral representations, means for simultaneously deriving from each of said signals auxiliary electrical signals indicative of the negative relative luminosity components of the spectral mixture curves for the equal-energy spectrum in terms of radiations of selected component colors as matching stimuli, and means for electrically combining algebraically said electrical signals and said auxiliary electrical signals to simultaneously form an individual component color signal train for each of said selected component colors.

2. A color television transmitter comprising in combination image pickup devices to convert an image into electrical signals and wherein each selected spectral representation has simultaneous and independent signal trains, and electrical mixing means electrically connected to said image pickup devices for mixing only fractional portions of each of said independent signal trains with all the other of said independent signal trains.

3. A color television system comprising in combination an image pickup device consisting of an arrangement to convert a multiple color image into electrical signals and wherein each selected spectral representation has an independent simultaneous type signal train, and means including an electrical mixing circuit connected to receive said signals for subtracting only fractional portions of each of said independent signal trains from all the other of said independent signal trains.

4. A color television system comprising in combination a plurality of component color signal channels adapted to maintain simultaneously component color signals identity throughout transmission and reproduction, a multiple color image pickup device electrically connected to said signal channels, and interconnected networks in all of said signal channels conveying to each of said channels simultaneously signal energy representative of the negative relative luminosity components of the spectral mixture values of the image.

5. A color television transmission system comprising in combination three different selected component color image signal transmission channels, three different selected component color image responsive television cameras, a separate output circuit connected to each of said cameras, a separate pair of resistive elements connected in parallel with each of said output circuits, each of said resistive elements having an electrical terminal intermediate the ends of the resistive elements, a separate signal mixer circuit connected in each of said output circuits and a connection between each of said terminals and said mixing circuits.

WILLIAM H. CHERRY.

REFERENCES CITED

The following references are of record in the file of this patent:

UNITED STATES PATENTS

| Number | Name | Date |
|---|---|---|
| 2,165,168 | Hardy | July 4, 1939 |
| 2,193,722 | Hardy | Mar. 12, 1940 |
| 2,253,086 | Murray | Aug. 19, 1941 |
| 2,272,638 | Hardy | Feb. 10, 1942 |
| 2,309,506 | Herbst | Jan. 26, 1943 |
| 2,316,581 | Hardy | Apr. 13, 1943 |
| 2,335,180 | Goldsmith | Nov. 23, 1943 |
| 2,375,966 | Valensi | May 15, 1945 |
| 2,461,515 | Bronwell | Feb. 15, 1949 |
| 2,492,926 | Valensi | Dec. 27, 1949 |